United States Patent
Madichetti et al.

(10) Patent No.: US 11,526,652 B1
(45) Date of Patent: Dec. 13, 2022

(54) AUTOMATED OPTIMIZATION OF DISPLAYED ELECTRONIC CONTENT IMAGERY

(71) Applicant: Amazon Technologies, Inc., Reno, NV (US)

(72) Inventors: Nishanth Madichetti, Seattle, WA (US); Gowtham Chandrasekar, Dharmapuri (IN); Hemanthkumar S, Kanchipuram (IN); Sanjay Singh, Chennai (IN); Vasanth Elancheralathan, Puducherry (IN); Vignesh Jayaraman, Trichy (IN); Gajendran Mani, Chennai (IN); Prasanna Somasundaram, Seattle, WA (US); Lokesh Joshi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/102,117

(22) Filed: Nov. 23, 2020

(51) Int. Cl.
| | |
|---|---|
| *G06F 40/106* | (2020.01) |
| *G06T 11/60* | (2006.01) |
| *G06N 3/08* | (2006.01) |
| *G06N 3/04* | (2006.01) |
| *G06K 9/62* | (2022.01) |

(52) U.S. Cl.
CPC ......... *G06F 40/106* (2020.01); *G06K 9/6256* (2013.01); *G06N 3/04* (2013.01); *G06N 3/08* (2013.01); *G06T 11/60* (2013.01)

(58) Field of Classification Search
CPC ......... G06F 40/106; G06T 11/60; G06N 3/04; G06N 3/08; G06K 9/6256
See application file for complete search history.

(56) References Cited

U.S. PATENT DOCUMENTS

| | | | |
|---|---|---|---|
| 7,979,785 B1* | 7/2011 | Wang | G06F 16/9577 715/251 |
| 9,418,310 B1* | 8/2016 | Chen | G06V 30/133 |
| 2004/0004641 A1* | 1/2004 | Gargi | G06T 11/60 715/848 |
| 2009/0238491 A1* | 9/2009 | Mizutani | G06T 3/40 382/298 |
| 2012/0288190 A1* | 11/2012 | Tang | G06F 16/5846 382/199 |
| 2013/0024757 A1* | 1/2013 | Doll | G06F 40/143 715/204 |
| 2017/0365083 A1* | 12/2017 | Hartrell | G06V 30/19167 |
| 2020/0193238 A1* | 6/2020 | Ghuge | G06K 9/6267 |

\* cited by examiner

*Primary Examiner* — Stephen S Hong
*Assistant Examiner* — Ahamed I Nazar
(74) *Attorney, Agent, or Firm* — Hogan Lovells US LLP (57) ABSTRACT

Images in e-book and other electronic media content can be automatically enhanced for viewing on client devices, using various image categories, attributes, and expected qualities. Should systems and methods determine, based on the categories and attributes, that a given media object does not satisfy at least one rule for optimized presentation of the content on a particular client device, an updated presentation of the content can be generated, possibly in accordance with a predetermined specification. The updating may be in the form of image enhancement through adjustment of the size of the images in the media object. Machine learning schema can assist in recognizing images by category, importance and readability scoring, and in adjusting the images for optimal viewing.

19 Claims, 5 Drawing Sheets

AUTOMATED OPTIMIZATION OF DISPLAYED ELECTRONIC CONTENT IMAGERY

BACKGROUND

Consumers are increasingly utilizing various electronic devices to access digital content. In the case of an electronic book ("e-book"), for example, one can use a portable electronic device such as an e-book reader to read the various pages of the book, be it a piece of fiction or research article in a technical journal. Readers, though, frequently have a frustrated experience due to suboptimal image layouts, which are both difficult to perceive and disruptive to reading flow. Moreover, customers quite often perceive image layouts differently depending on image type; put differently, a photograph likely has an acceptable image width which differs from that for a text-based image (e.g., a flowchart, technical diagram, or map). The situation is exacerbated for those who prefer to read on mobile phones, where maps, tables, and the like often appear in the form of small, "thumbnail"-sized images between paragraphs of text. Certain approaches have attempted to resolve this by requiring individual publisher action or requiring reader interaction with the thumbnail image, but these approaches each suffer from different deficiencies, such as involving a separate viewer for image expansion (a capability of which the reader may very well not even be aware), and those approaches have not provided a solution desirable for the majority of users.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to image display in e-books and other electronic content. Various embodiments utilize one or more algorithms to automatically enhance image layouts by determining appropriate image-type and device-specific layouts, thereby delivering a seamless reading experience for one perusing, say, an e-book. And it should be well noted that, while the term e-book is used herein solely for convenience, the present disclosure can be applied to a vast variety of electronically-provided content, including, for example, Portable Document Format ("PDF") files and Web pages.

In particular, one or more trained models heuristically apply modules and/or algorithms to detect the layouts of images in a given piece of content, including "natural"-type images (photographs), text-based images, and illustrations (including cartoons and comics) and, based at least in part on image categories, scoring, rules, and specifications, applies a device-appropriate layout in the form of adjusted image width and/or height, automatically. The layout is applied in a way that is adaptable to varying device screen sizes, ensuring that the image will not appear too small on smaller screens or, via border "guard rails," too stretched on larger screen devices. On enhancing the image layout, the quality of the image may be validated. By using this automated approach, rapid scaling of content delivery is facilitated, as rules are not needed for every potential type of image, nor is manual verification of the image analyses and enhancements required. Various other functions and advantages are described and suggested as may be provided in accordance with the illustrative embodiments.

Figure 1A:
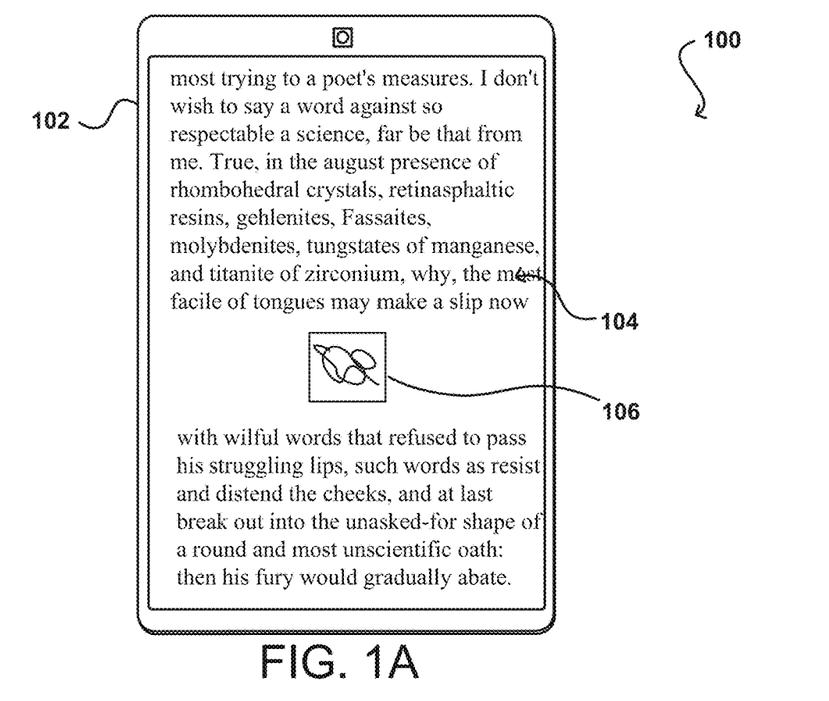
FIGS. 1A and 1B illustrate pages of e-book content displayed on a computing device in accordance with various embodiments.
Figure 1B:
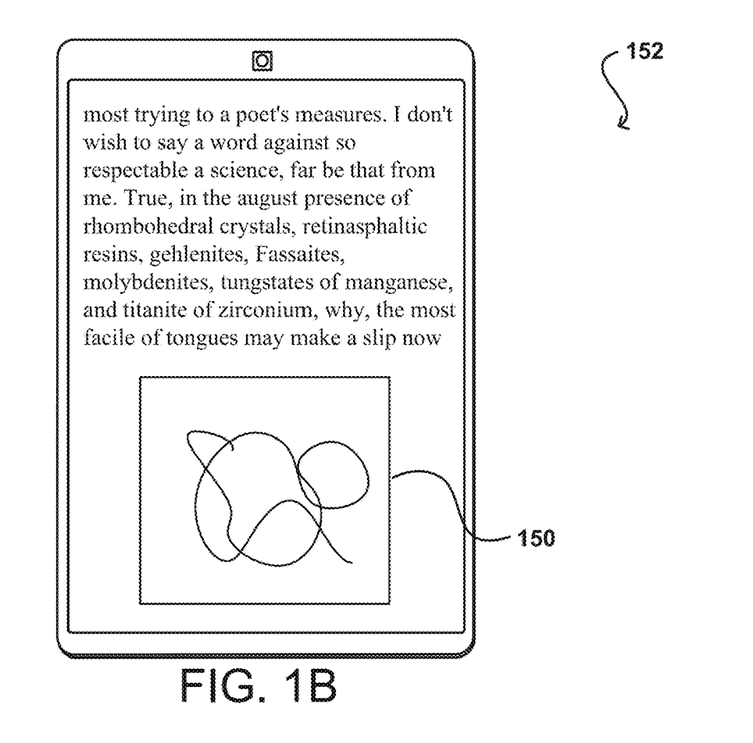

FIGS. 1A and 1B illustrate the results of one example approach for optimizing a display of content that can be utilized in accordance with various embodiments. In the example situation 100 of FIG. 1A, a computing device (including an e-book reader or other such device) 102 is displaying a page 104 (or other such grouping) electronic media content corresponding to an e-book purchased by a user of the device 102, although, as discussed elsewhere herein, other types of digital content can be utilized as well, as may include video or audio content, Web content, PDF content, and the like. Further, although a portable computing device 102 is illustrated for purposes of this example, it should be emphasized that various other types of devices can be utilized to display the content 104 as well, as may include a tablet computer, a smart phone, a desktop computer, a notebook computer, a personal data assistant, a video gaming console, a television set top box, a wearable computer (e.g., a smart watch or glasses), or a portable media player, among other such devices. As known for such purposes, a user can navigate through the content using input mechanisms (i.e., user-selectable page turn buttons or other such elements) of the device in order to read the e-book or at least obtain access to portions of interest to the user. The size, shape, content, and other aspects of content 104 portions can vary by embodiment, such as may be based upon factors such as screen size, screen resolution, portion of the screen displaying the content, layout of the content, and the like.

The content 104 in FIG. 1A includes an image 106, as originally included in the subject media object and prior to any optimization or enhancement hereunder. As may be seen, the image 106 is relatively small in size, compared to the size of the entire displayed page, and is along the lines of what is known in computing circles as a "thumbnail"-type image. However, rather than serving to inform the reader, due to its limited size, this image 106 is of minimal use and more of an impediment than anything else. On the other hand, the representative enhanced image 150 reflected in the updated setting 152 of FIG. 1B, as optimized in line with the present disclosure, is immediately useful to the reader and does not require any sort of separate image reader to make the image 150 perceptible.

Figure 2:
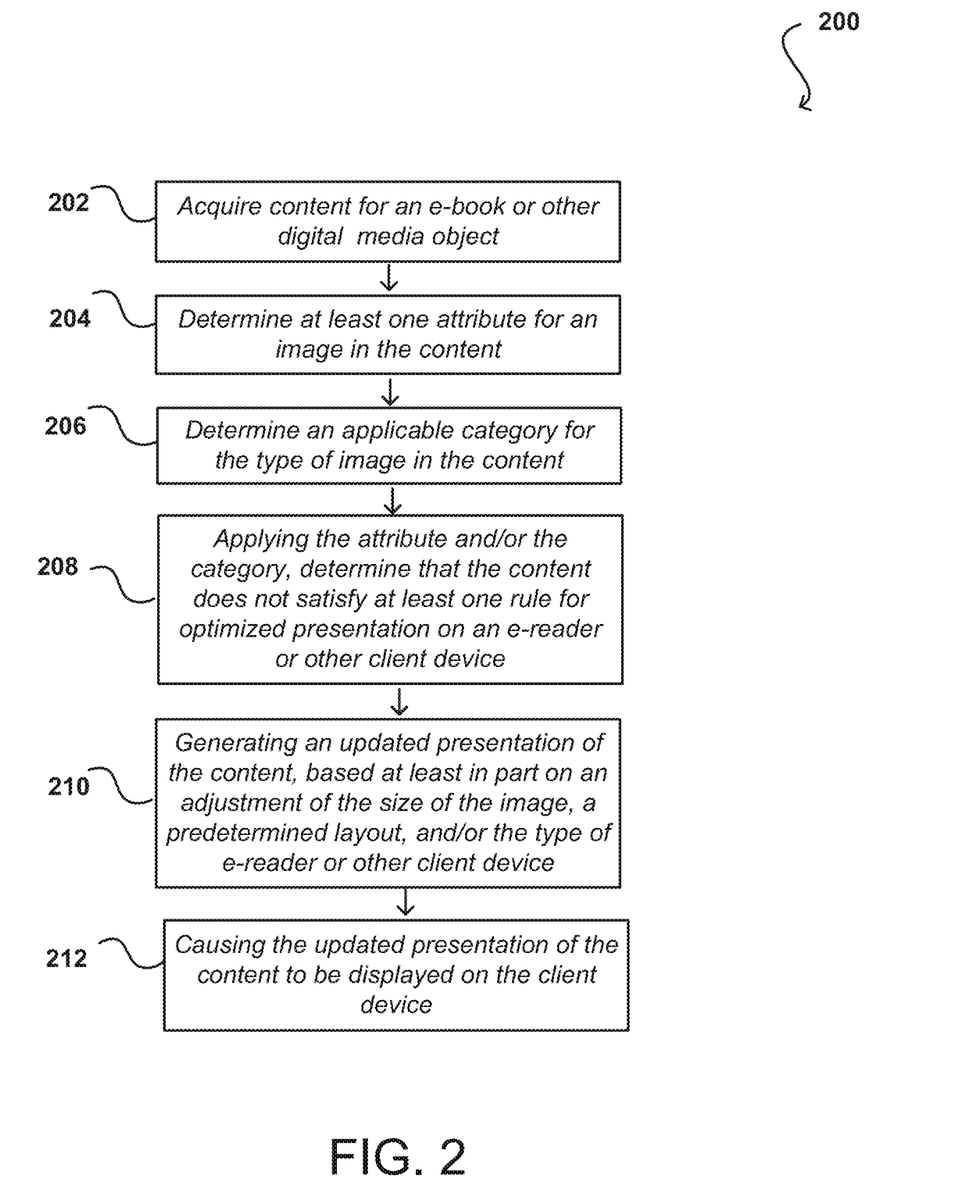
FIG. 2 illustrates an example process flow for enhancing e-book content display in accordance with various embodiments

FIG. 2 depicts a process flow 200 for one illustrative embodiment of the present systems and methods for automatically enhancing the layout of e-book content, including the image optimization shown in FIG. 1B. In this version, as initial step 202, applying one or more computer systems configured with executable instructions, content is acquired for an electronic media object, such as an e-book. For each image in that digital content, one or more analyses 204 may (but need not be) performed to ascertain an attribute for the particular image. In some embodiments, as discussed below, this may be an automated decision regarding the importance of the image, potentially scored based on the surrounding context of the image. If it is determined that the image should not be considered important, its original sizing and layout is maintained. Other attributes, however, such as a unique identifier for the content product and/or the image size, may be employed in addition to, or instead of, importance.

A further determination, at step 206, for one or more of the images in the content can be made with regard to image category. As will be discussed, images can be categorized in any number of ways, including consideration of whether the image includes text or is an illustration. At this point, in some representative embodiments, it is determined whether the content layout for the image should be deemed acceptable for a particular client device. In other words, the systems and methods perform a computer-based analysis of whether the content's existing layout, with regard to the image, is satisfactory. In addition to using the attributes and categories, rules and layout specifications, as discussed herein, may be utilized to assist in such analyses 208 for each image in a given piece of content. If an updated layout is deemed advisable due to unsatisfactory existing layout, an updated presentation can be generated at step 210, based at least in part on an adjustment of the size(s) of the subject image(s). When enhancing the image layout, in addition to setting width or height based on a percentage of overall screen size, it is also possible in some embodiments to specify a maximum image height and/or width in one or more units of measurement. This approach ensures content images will not appear scaled on client devices with larger displays, such as tablets and personal computers (laptop and desktop, for example). A provider may wish to check the enhanced layout, potentially using sizing guidelines or "guard rails" as discussed herein. For each image that does not pass the guard rail check, the original image layout may be reinstated. Ultimately, as shown in exemplary step 212, the enhanced layout of the content will be ascertained acceptable and made available for presentation on a display of one or more types of client devices. Further, there will generally be no perceptible delay as the update will occur on the back-end in some embodiments prior to consumer consumption, or potentially using client device computing capabilities "on the fly," as a reader peruses the content. In the alternative latter case, the layout enhancement would be done on a case-by-case basis, at the client device end, applying one or more software modules and/or applications applying the methods herein.

In the course of enhancing a given display of content, it may be necessary, or at least optimal, to automatically "flip" or update the currently-displayed page due to the increased size of one or more images in the content. Along these lines, as the layout of a given image is enlarged, it may be desired to move related text below the image (e.g., a caption) to the subsequent page in the content.

As noted, illustrative embodiments can determine types or categories of images as part of optimizing or enhancing the layout of e-books or other content. This notion of categorization is open-ended by design, and potential categories include, but are not limited to, the following: a "natural" image (such as photographs or historical imagery without much, or any, text), a "non-natural" or text-involved image (maps, tables, charts, and the like), a color image, a black-and-white image, an illustration (e.g., images such as line art not originating via a camera). With regard to illustrations, in the e-book setting, the imagery encountered, in all likelihood, will be raster (i.e., composed of an array of pixels) such as a GIF ("Graphics Interchange Format") or JPEG ("Joint Photographic Experts Group") picture, as opposed to path-based vector graphics composed of paths. It is worth noting that an e-book, such as a comic book, may be considered a fixed-width piece of content and automatically determined to not any image layout optimization or enhancement.

The layout of e-book and other content may present a source width and/or height provided by the author, publisher, or the like. In cases where that data is not known in a content catalog, an image width (for example as a percentage of the content's entire width) is determined and stored, potentially as a pixel count attribute. When the present systems and methods encounter pre-classified image groups and the like in content, it can be applied and thereby facilitate the categorization and sizing for layout enhancement purposes. Such existing image groups could include common and/or "nested" images with siblings having a common parent, images within a border, and images inside table.

Many measurements for the images enhanced hereunder are possible, to overcome poor layouts experienced by many readers. An appropriate layout can be determined by applying rules which use size or measurement-based layout specifications, based on content image categories. A maximum width/height in inches can be determined for all content images, to ensure the images do not appear too stretched on large client device screens. In particular, one or more rules may be directed to text readability, based on concepts such as desirable resolution(s) and a related scoring system, and applied in connection with content images containing text. Optionally, a provider could apply image enhancement requirements in the interest of permissible latency, given current client device processing and display capabilities.

With regard to natural images, having minimal or no text, in some embodiments a width that is sixty percent (60%) of available width is employed; conversely, it may be seen that a width of fifty-five percent (55%) or less may yield a poor quality image. A width of seventy-five percent (75%) for enhanced photographs should yield a satisfactory quality for the reader. For text-based images, a width of at least eighty percent (80%) is recommended, as a percentage less than that figure may result in an image which is difficult to read, particularly if much text appears in the image. For illustrations, even more variety possible in the widths, but using a percentage of at least seventy-five percent (75%) should give the reader a satisfying, enhanced representation.

Even more particularly, in some illustrative embodiments of the present systems and methods, an enhanced layout specification may be based on image orientations (e.g., landscape or portrait) and image width/height ranges, in pixels. The image orientation is determined based on an image aspect ratio (i.e., image width in pixels:image height in pixels). Exemplary enhanced layout specifications using orientations for natural color and black-and-white images, where image width is at least 250 pixels, are set forth in Table 1 below (with subsequent Table 2 providing details on determining the image orientation).

TABLE 1

| Width Range in Pixels | Height Range in Pixels | % Width | Max Width in Inches | % Height | Max Height in Inches |
|---|---|---|---|---|---|
| NATURAL COLOR LANDSCAPE IMAGES | | | | | |
| W > 900 | | 100% | | | |
| 900 > = W > 600 | | 100% | 5 | | |
| 600 > = W > 450 | | 90% | 4.5 | | |
| 450 > = W > 300 | | 75% | 3.75 | | |
| 300 > W > = 250 | | Use 512 Px Calculation | 3 | | |
| NATURAL COLOR PORTRAIT IMAGES | | | | | |
| W > = 250 | H > 1000 | | | 100% | |
| | 1000 > = H > 750 | | | 100% | 5.4 |
| | 750 > = H > 550 | | | 90% | 4.8 |
| | 550 > = H > 400 | | | 75% | 4 |
| | 400 > H | Use 512 Px Calculation | 3 | | |
| NATURAL B/W LANDSCAPE IMAGES | | | | | |
| W > 900 | | 100% | | | |
| 900 > = W > 600 | | 100% | 5 | | |
| 600 > = W > 450 | | 90% | 4.5 | | |
| 450 > W > = 250 | | 75% | 3.75 | | |
| NATURAL B/W PORTRAIT IMAGES | | | | | |
| W > = 250 | H >1000 | | | 100% | |
| | 1000 > =H > 750 | | | 100% | 5.4 |
| | 750 > = H > 550 | | | 90% | 4.8 |
| | 550 > = H > 300 | | | 75% | 4 |
| | 300 > H | Use 512 Px Calculation | 3 | | |

TABLE 2

IMAGE ORIENTATION

| | |
|---|---|
| ASPECT RATIO > = 2/3 | LANDSCAPE |
| ASPECT RATIO < 2/3 | PORTRAIT |

As may be seen in the following Table 3, some representative embodiments determine a width percentage, based on a 512 pixel computation. For content images having a width of less than 250 pixels, the width percentage in some embodiments will be set based on such a 512 pixel computation, and the maximum width will be set to three inches (3").

TABLE 3

512 PX CALCULATIONIMAGE ORIENTATION

| IMAGE WIDTH IN PIXELS | WIDTH % |
|---|---|
| W > = 512 | 100 |
| W < 512 | (IMAGE WIDTH IN PIXELS/512) * 100 |

Certain layouts, having images of any type and size, will include panels or sections on a given page which impact the optimization of any images on that page content. Further still, it may be desirable to treat cover images as a unique category. In some embodiments, cover images in the landscape orientation will be set to one hundred percent (100%) width, while cover images in the portrait orientation will be set to one hundred percent (100%) height. Regardless of category or width, layout enhancement will not be desirable for images whose layout is already better than the layout suggested by specifications of the sort above.

Figure 3:
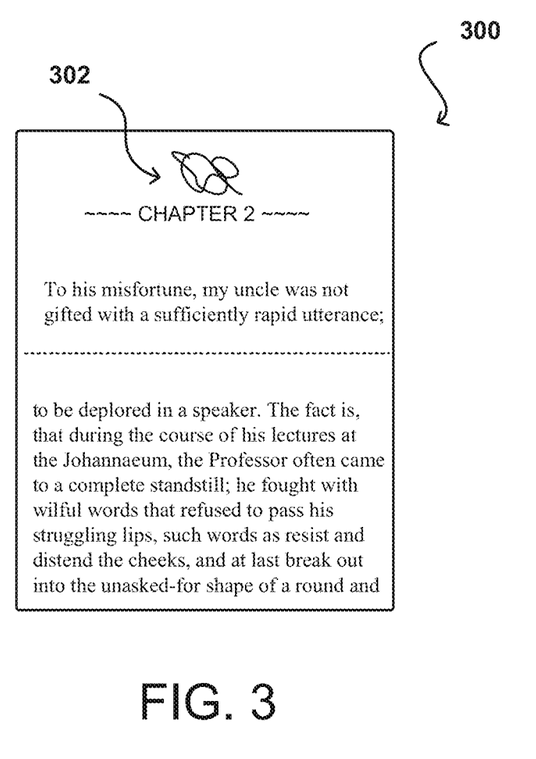
FIG. 3 illustrates an additional page of e-book content displayed on a computing device in accordance with various embodiments.

Optionally, the layout optimization may use flags, tags, or any number of other forms of identifiers in combination with to identify or pinpoint content candidates in a catalog or database. But one example of a unique attribute is metadata in the form of the Amazon Standard Identification Number ("ASIN"). An ASIN is a ten-character alphanumeric unique identifier assigned by Amazon.com and its partners for product identification within the Amazon organization. Of course, the content need not be ASIN-tied to have its layout enhanced per the present disclosure; a number of other catalog item flagging approaches, including those known in the data structure and information systems areas, can be used within the scope of the various embodiments. Flags can also be used to provide information such as the number of portions to use, portions of content to update, links to related content, number and size of page turns to perform, etc. The flags can specify specific numbers or parameters in some embodiments, or they can provide information that can be used with other information about the device and/or content to determine the appropriate behavior. As but one illustration, a flag might indicate, for a screen below a certain size, to use two regions, and, for a screen above that size, to use three regions. For example, graduate research texts probably have different reading parameters than text for toddlers or preschoolers Of course, there is an amount of imagery in an e-book which only serves an ornamental or decorative purpose, such as a chapter heading, or at least not is essential, or even relevant, to the substance of the content, such as material marketing other works by the content's publisher. The decorative or irrelevant content may turn out to be a substantial portion of the imagery in a given e-book, upwards of 33% (or higher) of the total imagery for the content. Thus, the layout enhancement process hereunder may, in some illustrative embodiments, commence with, or at least include, an image importance analysis or check, based on an automated, algorithmic determination of whether the image is "important" in the sense of adding to the substantive narrative of the e-book. Should a given content image be deemed not important, in some embodiments, it will not be altered in size or otherwise adjusted for layout purposes. An example of this scenario 300 is shown in FIG. 3, where representative content imagery in the form of a chapter heading 302 has been deemed ornamental and unimportant, and the size of the image is unaltered To assist with this analysis, one or more image importance detector modules, algorithms, or other elements can be employed, with the importance detection feature configured to be capable of detecting the relative importance of an image. Factors for these module(s) and algorithm(s) to consider are directed to the substantive meaning of the text. Analyses by trained machine learning models, as discussed herein, can be performed as part of the image importance checks. Importance may vary by provider and subject matter, but, in some illustrative implementations, is based at least in part on one or more substantive analyses, by at least one trained model, of the image's context; these analyses could apply a predetermined textual vicinity when determining what context to consider for the importance checks. In addition, or alternatively, a content provider could manually identify images as important or not, be it as a "spot" check or review of all items in a content catalog.

Figure 4:
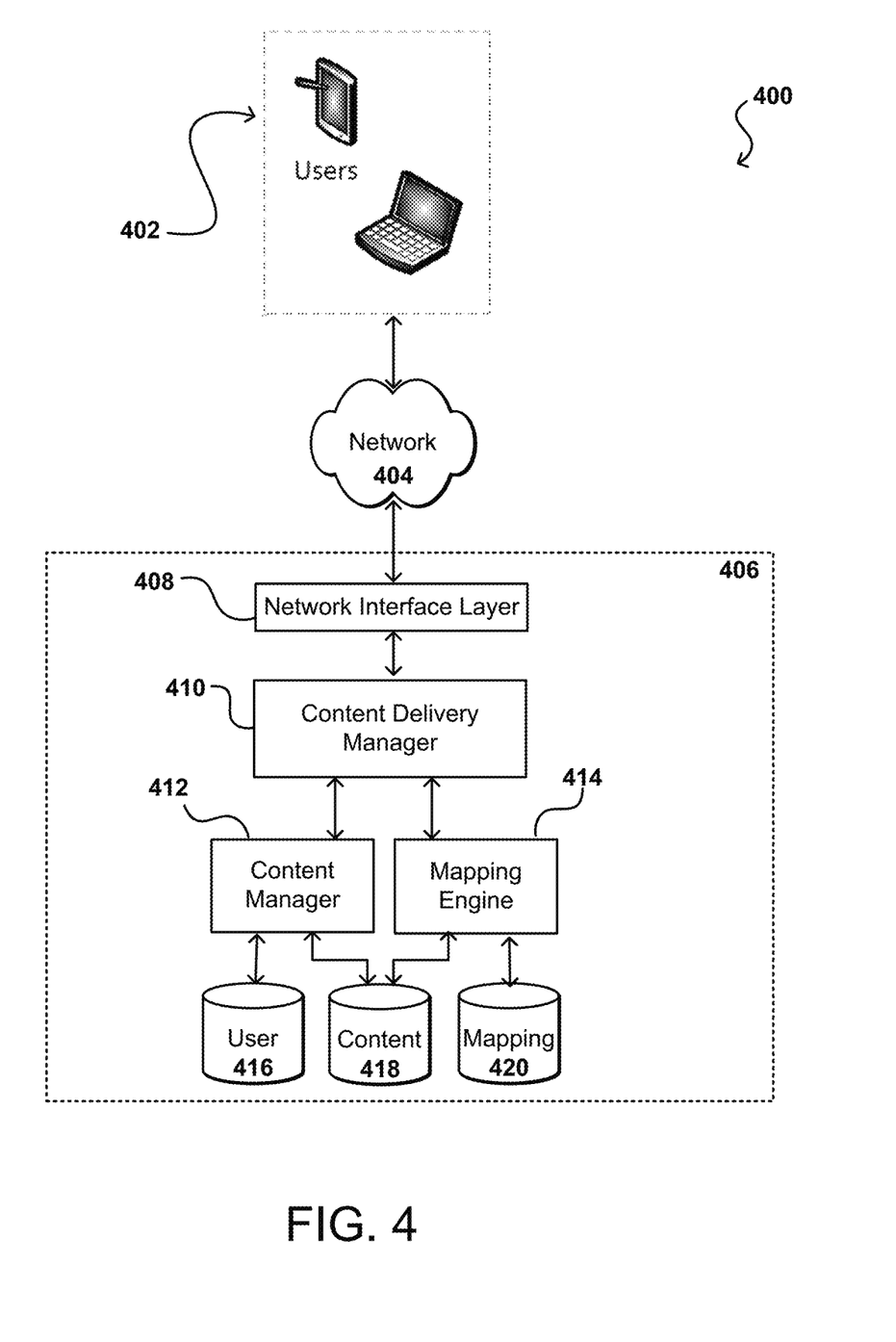
FIG. 4 illustrates an example system that can be utilized to implement aspects of the various embodiments.

FIG. 4 provides a high-level view of an illustrative environment 400 in which digital content, such as e-book content including enhanced image layouts, can be provided to a user. In this example, consumers can utilize any of a variety of electronic client devices 402, including those discussed herein such as an e-book reader, to purchase, download, or otherwise obtain e-book content. For example, a user can cause his or her device 402 to submit a request for the digital content across at least one appropriate network 404, whereby the content (or at least a portion of the content) is returned for presentation on the device 402. In some embodiments the entire e-book can be transmitted to the electronic device in a single transmission (or batch of transmissions), while in other embodiments portions of the e-book can be transmitted on-demand, such as when a user is about to access a new page of content. The network 404 can include any appropriate network, such as may include the Internet, a local area network ("LAN"), a cellular network, and the like. The request can be sent to an appropriate content provider 406, as may provide one or more services, systems, or applications for processing such requests and providing access to the appropriate content. In this example, the request is received to a network interface layer 408 of the content provider system 406. The network interface layer 408 can include any appropriate components known or used to receive requests from across a network, such as may include one or more application programming interfaces ("APIs") or other such interfaces for receiving such requests. The network interface layer 408 might be owned and operated by the provider, or it could be leveraged by the provider as part of a shared resource or "cloud" offering. The network interface layer 408 can receive and analyze the request, and it can cause at least a portion of the information in the request to be directed to an appropriate system, service, or component, such as an overall content delivery manager 410.

A content manager 412, to facilitate image analyses and enhancements contemplated herein, may employ one or more software modules or functions handling content image mining, image importance detection, and image size adjustment. The content manager 412 can also lookup information in a user data store 412 or other such location to determine whether the user has access rights to the content for the device, such as where the user has purchased the content for viewing on that device or has an account with access to the content, among other such options. If the user has access rights, the content can be pulled from a content data store 414 or other such location and transmitted across the at least one network 404 (using the same or different component networks) for display on the client device 402.

As mentioned, as the user is viewing or otherwise consuming the content on the device 402, the device might determine to periodically update portions of the page based upon factors such as the layout optimization contemplated herein. Accordingly, the device 402 can submit a request for the next page of content to the content provider, whereby the content delivery manager can determine the portion of content to send and cause that content to be sent to the device 402. It might be the case in some embodiments that the device 402 will send information specifying the content to be received. Often, however, the device 402 will not know enough information in advance to request the specific content needed. In such instances, approaches in accordance with various embodiments obtain information such as device 402 screen size and resolution (both of which may be obtainable using device type information instead), font settings, application display area, and other such factors to determine the amount of content that is displayable concurrently on the device 402. A mapping engine 416 or other such component can then compare this information against the available content from a content repository 418 to determine the portion of content to provide to the device 402. The mapping engine 416 might utilize mapping data that provides information about how to handle certain content on certain devices, such as images and tables, as well as how to insert flags or tags into the content that can cause the device to update portions of the content in specific ways. The content from the mapping repository 420 in some embodiments thus may be rules or policies instead of specifications or other specific mapping data. There may also be specific mapping information for certain users or types of users, as may be based upon preference or historical information among other such options. Each time new content is to be displayed on the electronic client device 402, the appropriate content can be determined and transmitted to the device 402. In some embodiments more than a page (or half page, etc.) of content may be transmitted, or may be transmitted in advance, in order to reduce latency and ensure that a smooth user experience is provided in the event of a temporary loss of network or data connection, among other such events. For the avoidance of doubt, though, there is no need for separate databases of stored optimized content in order to enhance content layouts as contemplated herein.

The image importance check may be followed in some embodiments by an analysis of whether the image layout is acceptable irrespective of the image category. This validation-type check, which can be performed before image optimization by an image quality detection module or element capable of detecting image quality, is for optimization purposes, to ensure that the image category detection happens only when it is necessary and that any optimization efforts do not degrade existing image quality. Essentially, in some embodiments, the selected validation criteria includes an analysis of whether the image text (if any) is readable, possibly by a machine learning-trained model focused on pixel counts and display resolution scoring. The quality detection module can calculate and provide a quality score considering one or more of the image layout and the image resource. Manual validation of layout-enhanced images is also possible, as an addition or alternative to the automated step. If the check fails, the image category will be determined for layout enhancement. Based on the image category, the appropriate layout will be determined from a predetermined layout specification. Then, the image layout will be enhanced in size only if the existing image layout is smaller than the layout determined from the specification.

Naturally, providers of content do not want to stretch an image too far and cause an unappealing, or even imperceptible, image. So, in addition to ensuring that an original content layout is retained if it already meets quality expectations, embodiments of the present systems and methods may use automated quality guard rails and related grading to ensure the image quality doesn't degrade after an image-enlarging layout enhancement. Factors such as column width and image wrap can affect the selection of the appropriate guard rail to be applied for preferable layouts for reading or otherwise viewing specific content. Known image pixel counts can also assist in determining suitable guard rails. Further, machine learning techniques, including convolutional neural networks and others discussed herein, can be applied to determine appropriate layout-specific guard rails. As time goes by, and technology progresses with new client devices and larger display screens, new guard rails may be needed to account for such devices. Manual guard rail setting and/or approval can be used as an additional or alternative feature in some embodiments.

Again, it is certainly within the scope of the present disclosure that a myriad of client devices be used with the systems and methods for image layout enhancement, including, for content perusal, "smart" televisions or video game consoles executing software apps. And the enhancement itself can be performed on any number of formats of electronic content, including, by way of example, magazines, newspapers, and research papers; in these cases, the importance of the images may very well be higher than is the case for the typical e-book, particularly fiction.

At any point, on the content provider back-end, layout enhancement efforts could be enabled or disabled for individually-identified content, such as via identifying by ASIN. One illustrative approach uses a mechanism dividing content into "whitelisted" or "blacklisted" content and optimizing only the images in content found "blacklisted." Consumer complaints and other feedback may trigger the need for a reversal or "roll back" of the enhancement of a given piece of content. In such case, the provider may roll-back a single image in a piece of content or all of them in that content. It is also envisioned that a user be permitted, by provided software, to manually override image enhancement, with such feature entailing inclusion of original, non-enhanced images in a delivered instance of content.

Audits may be performed to validate the accuracy of the category, quality, and other determinations hereunder. More specifically, automating a manual audit process, for verifying the "before" and "after" presentations of content images, can facilitate the image quality detection process and validation of the reader experience, potentially by calculating quality scores based on the various image layouts. Further, any one or more of an image importance, category, or quality data that are determined during the layout enhancement process can be maintained as persistent metadata properties. As importance, category, and quality determinations will be computed for a majority of the images in a given piece of content, such information can be beneficially reused by post-publishing systems.

As noted, neural network, deep learning, and other machine learning techniques have any number of applications for present purposes. As is known in the neural network and artificial intelligence arts, a variety of neural network types could be applied, including, but by no means limited to, feedforward, recurrent, radial basis function, modular, and self-organizing neural networks. Prior to production environment use, a non-production sample data set of typical e-book content may be employed for training a neural network model for processing, and potentially enhancing, content images. Although graphics processing units ("GPUs") are effective for many deep learning neural network applications, the present systems and methods can be used with GPU-based or central processing unit ("CPU")-based systems.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions which depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options.

For example, one or more systems trained by machine learning can perform automated layout improvements and roll-backs, image categorizations, and appropriate guard rails implementations. And metrics, derived through machine learning, may assist the content provider in understanding tracking and performance notions such as: the percentage of images in each category which undergoes layout enhancement; the percentage of images in each category which suffers quality degradation upon layout enhancement; the rule(s) applied in each category for enhancing layout of content images; the average latency of performing layout enhancement for an image; the average latency of image category detection; the average latency of image quality detection; and the average latency for image validation. Any such metrics may be used for fine-tuning the layout transformation specification for a particular image category and could assist in flagging a particular category or rule in need of attention when the production use numbers deviate from what is expected.

Any type of neural network employed in connection with the present disclosure will likely need tweaking and/or additional or alternative elements to fit the specifics of particular situations. In certain embodiments, training a CNN may involve significant use of computation resources and time, such that this may correspond to a preparatory step to servicing content layout enhancement requests and/or performed relatively infrequently with respect to request servicing and/or according to a schedule. As known in the object-oriented and other computer science arts, the image attribute and quality detections hereunder may be accomplished through the use of separate software modules executing on top of a feature map.

Figure 5:
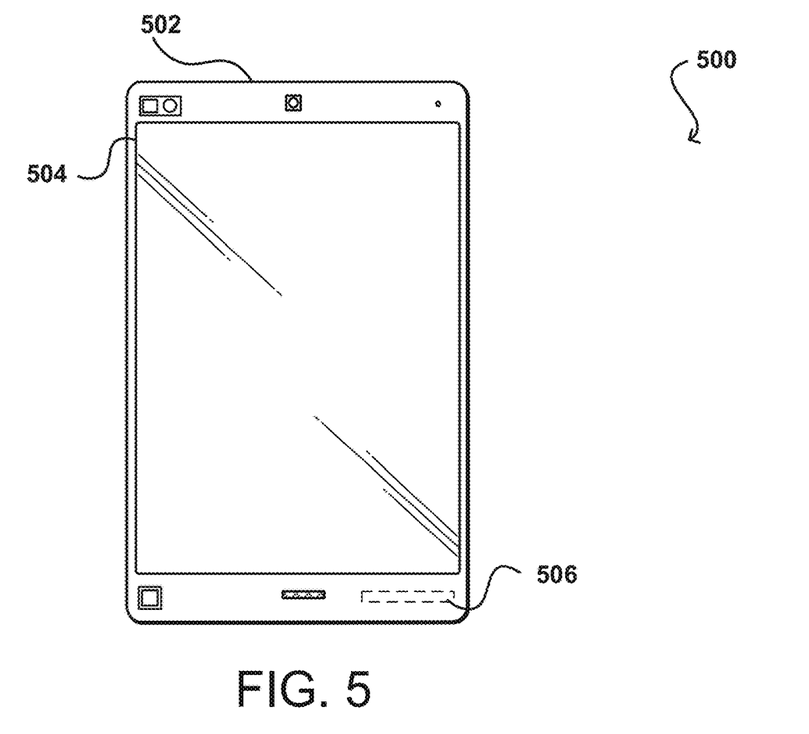
FIG. 5 illustrates an example client computing device that can be used to implement aspects of the various embodiments.

As noted herein, and illustrated in FIG. 5, the systems and methods include the use of electronic computing devices 500, including client devices, which can include any appropriate device operable to send and receive requests, messages, or information over an appropriate network and convey information back to a user of the device. These devices 500 can include any of a number of general purpose personal computers, such as desktop or laptop computers running a standard operating system, as well as cellular, wireless, and handheld devices running mobile software and capable of supporting a number of networking and messaging protocols. Examples of such client devices include personal computers, cell phones, handheld messaging devices, laptop computers, tablet computers, set-top boxes, personal data assistants ("PDAs"), e-book readers and the like. In the FIG. 5 example, the computing device 500 has an outer casing 502 and a display screen 504. The display screen 504 under normal operation will display information to a user (or viewer) facing the display screen (e.g., on the same side of the computing device as the display screen). In line with the disclosure herein, the device can internally include one or more communication components 506, such as may include a cellular communications subsystem, Wi-Fi communications subsystem, Bluetooth® communication subsystem, and the like. Such a device also can be in the form of workstations running any of a variety of commercially-available operating systems and other known applications for purposes such as development and database management.

Figure 6:
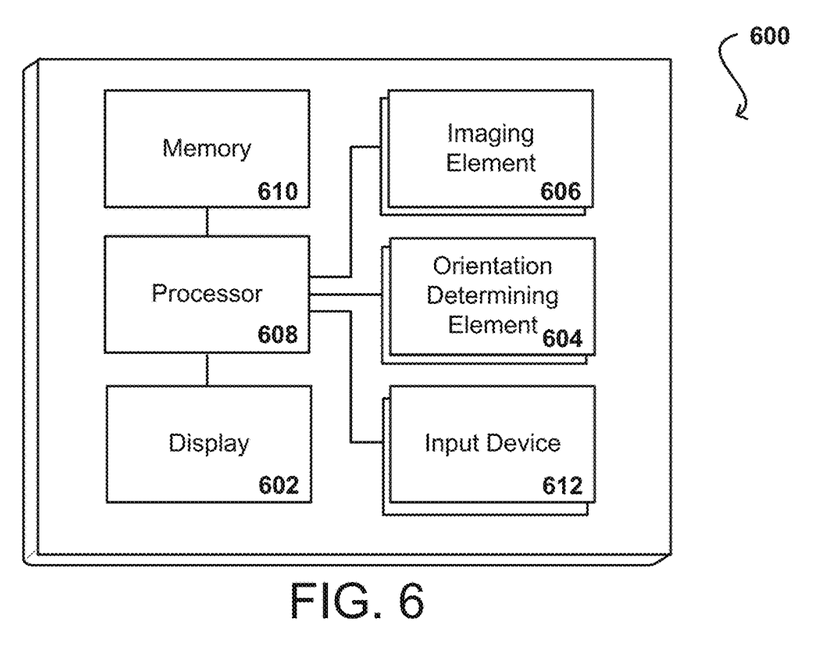
FIG. 6 illustrates example components of a computing device that can be utilized in accordance with various embodiments.

In this vein, FIG. 6 shows some components of note for a computing device 600 which can be used to optimize and display content to a user in accordance with various embodiments. While a portable smart device is discussed and depicted in many examples herein, the computing device 600 could be any appropriate device able to receive and process input commands, such as a personal computer, laptop computer, television set top box, cellular phone, PDA, e-book reading device, video game system, or portable media player, among others. This example device 600 includes a display element 602, such as a liquid crystal display ("LCD") or a touch-sensitive display screen, for displaying information to a user as known in the art. That said, devices such as portable media players might also convey information via other means, such as through audio speakers. The example device 600 also includes at least one orientation-determining element 604, such as an accelerometer or gyro element, which can be used to determine orientation and/or motion of the device, helpful to interpret motion in a captured image using various approaches described herein. Methods for using elements such as accelerometers to determine orientation or movement of a device are also known in the art and will not be discussed herein in detail. Other elements for detecting orientation and/or movement can be used as well within the scope of various embodiments, for use as the orientation determining element.

The device 600 may also include one or more image capture elements 606 which could be in the form of, for example, a front-facing camera, a charge-coupled device ("CCD"), a motion detection sensor, or a radiation sensor, among many other possibilities. The example device 600 can also include a microphone or other such audio-capturing device. The device 600 in at least some embodiments can also determine various actions based upon sound detected by the microphone. The computing device 600 can store, or otherwise have access to, at least one algorithm to process and analyze content images, as may be stored at least temporarily on the device itself, or it can send the images to be analyzed and otherwise processed by a remote computer or service. Any of a number of algorithms known in the computing art can be used to analyze images, detect features, apply categories and rules, enhance image size, and the like. Various other options can be utilized as well as discussed and suggested herein.

In this example, the device 600 further includes one or more processors 608 for executing instructions that can be stored in a memory device or element 610. As known in the art, the device 600 can include many types of memory, data storage, or computer-readable media, such as a first data storage for program instructions for execution by the processor 608, a separate storage for images or data, a removable memory for sharing information with other devices, etc.

In some embodiments, the device 600 can include at least one additional input device 612 able to receive conventional input from a user. This conventional input can include, for example, a push button, touch pad, touch-sensitive element used with a display, wheel, joystick, keyboard, mouse, keypad or any other such device or element whereby a user can input a command to the device 600.

Different components, such as one or multiple differing display drivers, can be used to render or otherwise display different portions of the content on a client device. For example, if the content can flip one half of the page at a time, a computing device might include a pair of display drivers for displaying content on different halves of the screen, although in some embodiments each driver may not be limited to exactly half of the screen. Each device driver can be implemented in hardware and/or software, as may include an integrated circuit ("IC") or state machine that accepts commands from a processing component or interface and generates signals useful for displaying the desired content on the relevant portion of the display element(s). In at least some embodiments, a display driver is a semiconductor IC that accepts commands over a general purpose interface, such as I2C, SPI, TTL, or CMOS, and generates signals with the appropriate current, voltage, and other properties for pixels of the appropriate display element. The display driver in some embodiments can include memory, firmware, and other such elements.

Factors such as screen size and font size may enable additional or fewer portions of the display to be updated as appropriate. User behavior can also be tracked in order to more accurately determine how to update and optimize the display of content. In some cases, a content creator or other entity can add tags or anchors to the content, essentially flagging content images for potential updating and/or other action. For example, a table or image might be related to certain paragraphs of content, and the image can be tagged such that the image remains displayed while the user is reading associated paragraphs. The image then can be removed or switched to other content when the user reads past the associated tagged paragraphs.

As discussed, the various embodiments can be implemented in a wide variety of operating environments, which in some cases can include one or more computing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin clients, gaming systems, and other devices capable of communicating via a network.

Various aspects also can be implemented as part of at least one Web or other service, such as may be part of a service-oriented architecture. Services such as Web services can communicate using any appropriate type of messaging, such as by using messages in extensible markup language ("XML") format and exchanged using an appropriate protocol like SOAP (derived from the "Simple Object Access Protocol"). Processes provided or executed by such services can be written in any appropriate language, such as the Web Services Description Language ("WSDL"). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU)", at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, and the like), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The systems and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

All of the specification and drawings are, accordingly, to be regarded in an illustrative rather than a restrictive sense. It will be evident that various modifications and changes may be made thereunto without departing from the broader spirit and scope of the invention as set forth in the claims.

What is claimed is:

1. A computer-implemented method, comprising:
under control of one or more computer systems configured with executable instructions,
obtaining content for a media object;
determining, by a model trained by a neural network, an importance for at least one image in the content, the importance based at least in part on a scored analysis of one or more portions of the content in a predetermined vicinity of the at least one image;
determining, by the model, a category for the at least one image;
determining, by the model, and based at least in part on one or more of the category or the importance, that the media object does not satisfy at least one rule for optimized presentation of the content on a client device;
generating, by the model, an updated presentation of the content, based at least in part on one or more of the category and an adjustment of the size of the at least one image, the adjustment based at least in part on a predetermined layout; and
causing the updated presentation of the content to be displayed on a display of the client device.

2. The computer-implemented method of claim 1, wherein the updated presentation of the content moves the at least one image to an adjacent page in the content.

3. The computer-implemented method of claim 1, further comprising:
providing one or more navigational elements enabling reversal of the updated presentation of the content to an original state of the content.

4. A computer-implemented method, comprising:
under control of one or more computer systems configured with executable instructions,
obtaining content for a media object, the content including at least one image and at least one predetermined layout;
determining, by a trained model and based at least in part on at least one of a category or an attribute for the at least one image, that the media object does not satisfy at least one rule for optimized presentation of the content on a client device, the attribute including an importance score based at least in part on a portion of the content in a predetermined vicinity of the at least one image, calculated by the trained model, for the at least one image;
generating, by the trained model, an updated presentation of the content, based at least in part on one or more of the category and an adjustment of the size of the at least one image, the adjustment based at least in part on the predetermined layout; and
causing the updated presentation of the content to be displayed on a display of the client device.

5. The computer-implemented method of claim 4, wherein the importance score for the at least one image to the content is based at least in part an analysis of a predetermined portion of context of the content.

6. The computer-implemented method of claim 4, wherein the adjustment of the size of the at least one image is based at least in part on a predetermined percentage of the width of the client device display.

7. The computer-implemented method of claim 4, further comprising:
determining that the at least one image includes text;
determining a resolution for the at least one image; and
verifying, based at least in part on the resolution, a readability score for the text in the at least one image.

8. The computer-implemented method of claim 4, wherein the at least one rule for optimized presentation is based at least in part on the category and the predetermined layout.

9. The computer-implemented method of claim 4, wherein the attribute is a unique identifier for the media object.

10. The computer-implemented method of claim 4, wherein the trained model is a convolutional neural network, and further comprising:
training the convolutional neural network using a sample data set, the sample data set including information associated with a catalog of one or more instances of electronic media;
determining, by the convolutional neural network, features found in the sample data set, the features including one or more of categories or layouts; and
determining, by the convolutional neural network, the updated presentation of the content.

11. The computer-implemented method of claim 4, wherein the media object is digital content in the form of an e-book, electronic document, a video file, or a video game.

12. A system, comprising:
at least one processor; and
a memory device including instructions that, when executed by the at least one processor, cause the system to:
obtain content for a media object, the content including at least one image and at least one predetermined layout;
determine, by a trained model and based at least in part on at least one of a category and an attribute for the at least one image, that the media object does not satisfy at least one rule for optimized presentation of the content on a client device, the attribute including an importance score based at least in part on a portion of the content in a predetermined vicinity of the at least one image, calculated by the trained model, for the at least one image;
generate, by the trained model, an updated presentation of the content, based at least in part on one or more of the category or an adjustment of the size of the at least one image, the adjustment based at least in part on the predetermined layout; and
cause the updated presentation of the content to be displayed on a display of the client device.

13. The system of claim 12, wherein the importance score for the at least one image to the content is based at least in part an analysis of a predetermined portion of context of the content.

14. The system of claim 12, wherein the adjustment of the size of the at least one image is based at least in part on a predetermined percentage of the width of the client device display.

15. The system of claim 12, wherein the instructions, when executed, further cause the system to:
determine that the at least one image includes text;
determining a resolution for the at least one image; and
verify, based at least in part on the resolution, a readability score for the text in the at least one image.

16. The system of claim 12, wherein the at least one rule for optimized presentation is based at least in part on the category and the predetermined layout.

17. The system of claim 12, wherein the attribute is a unique identifier for the media object.

18. The system of claim 12, wherein the trained model is a convolutional neural network, and wherein the instructions, when executed, further cause the system to:
train the convolutional neural network using a sample data set, the sample data set including information associated with a catalog of one or more instances of electronic media;
determine, by the convolutional neural network, features found in the sample data set, the features including one or more of categories or layouts; and
determine, by the convolutional neural network, the updated presentation of the content.

19. The system of claim 12, wherein the media object is digital content in the form of an e-book, electronic document, a video file, or a video game.

\* \* \* \* \*